(12) United States Patent
Saito et al.

(10) Patent No.: US 11,094,179 B2
(45) Date of Patent: Aug. 17, 2021

(54) DELIVERY MANAGEMENT SYSTEM, MANAGEMENT SERVER, DELIVERY MANAGEMENT METHOD, AND STORAGE MEDIUM OF PROGRAM

(71) Applicant: NEC CORPORATION, Tokyo (JP)

(72) Inventors: Yasuji Saito, Tokyo (JP); Hajime Suzuki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 16/646,389

(22) PCT Filed: Sep. 10, 2018

(86) PCT No.: PCT/JP2018/033387
§ 371 (c)(1),
(2) Date: Mar. 11, 2020

(87) PCT Pub. No.: WO2019/054317
PCT Pub. Date: Mar. 21, 2019

(65) Prior Publication Data
US 2020/0273306 A1   Aug. 27, 2020

(30) Foreign Application Priority Data
Sep. 12, 2017 (JP) .............................. JP2017-174510

(51) Int. Cl.
*G08B 13/24* (2006.01)
*G07C 9/22* (2020.01)

(52) U.S. Cl.
CPC .......... *G08B 13/2454* (2013.01); *G07C 9/22* (2020.01); *G08B 13/248* (2013.01); *G08B 13/2462* (2013.01)

(58) Field of Classification Search
CPC ............ G08B 13/2454; G08B 13/2462; G08B 13/248; G07C 9/22; G06Q 10/08
USPC ....................................... 340/686.1
See application file for complete search history.

(56) References Cited

U.S. PATENT DOCUMENTS 7,426,624 B2 * 9/2008 Fukuguchi ............ G06F 3/0605
                                                              711/163

FOREIGN PATENT DOCUMENTS

| JP | 2-038985 U    | 3/1990  |
| JP | 0238985 U     | 3/1990  |
| JP | 2001-323696 A | 11/2001 |
| JP | 2005-284944 A | 10/2005 |
| JP | 2007-240942 A | 9/2007  |
| JP | 2007-268024 A | 10/2007 |
| JP | 2009-146151 A | 7/2009  |
| JP | 2011-063980 A | 3/2011  |

OTHER PUBLICATIONS

International Search Report for PCT/JP2018/033387, dated Dec. 11, 2018.

* cited by examiner

*Primary Examiner* — John A Tweel, Jr.
(74) *Attorney, Agent, or Firm* — Sughrue Mion, PLLC

(57) ABSTRACT

A delivery management system includes: an authentication unit that authenticates a user; a storage unit that stores identification information on an article stored in a storage area that is a target article associated with the user; and a control unit that, when an article carried out by the authenticated user from the storage area is the same as the target article, permits the user to exit the storage area.

18 Claims, 12 Drawing Sheets

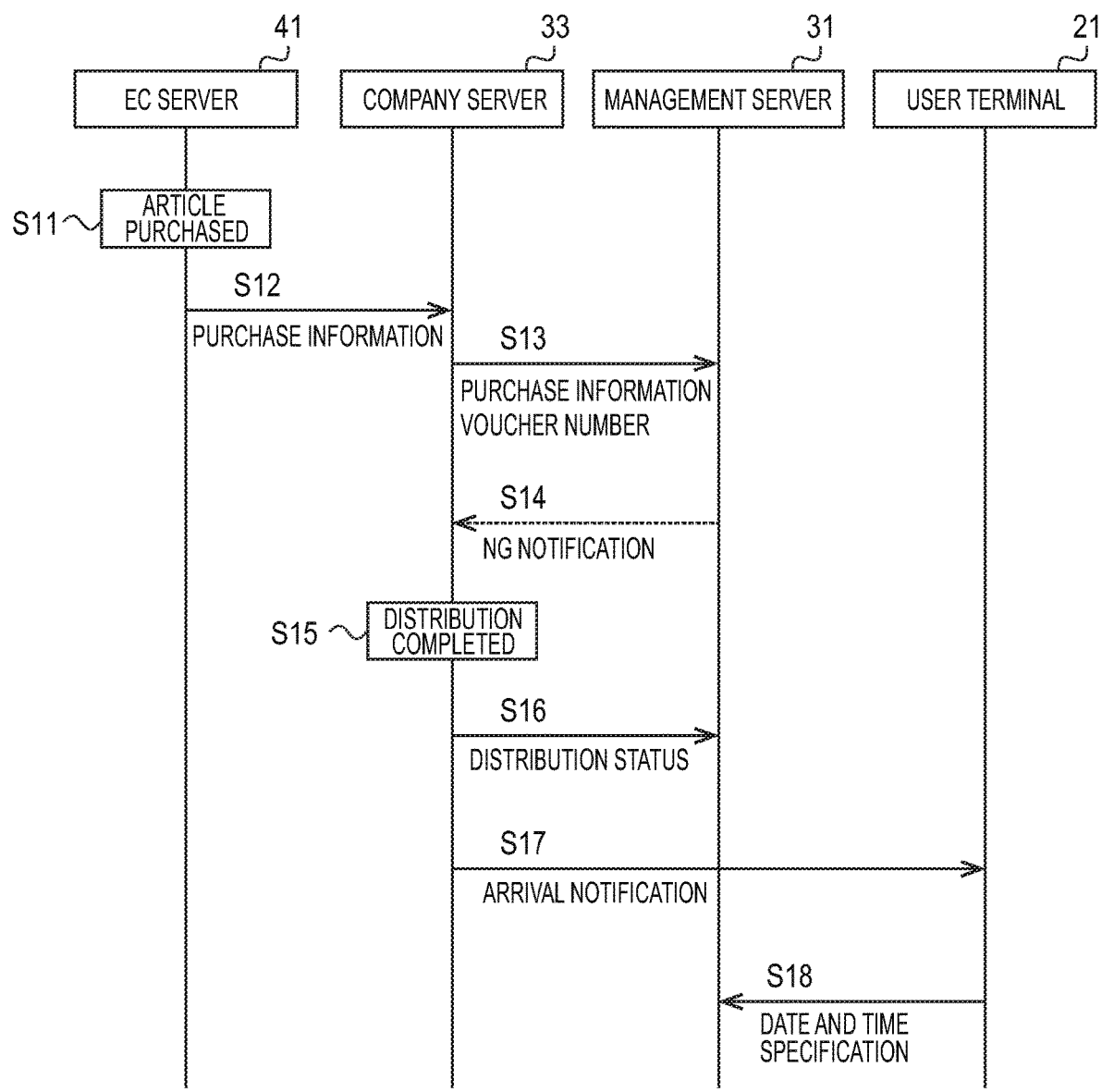

DELIVERY MANAGEMENT SYSTEM, MANAGEMENT SERVER, DELIVERY MANAGEMENT METHOD, AND STORAGE MEDIUM OF PROGRAM

CROSS REFERENCE TO RELATED APPLICATIONS

This application is a National Stage of International Application No. PCT/JP2018/033387 filed Sep. 10, 2018, claiming priority based on Japanese Patent Application No. 2017-174510 filed Sep. 12, 2017, the disclosure of which is incorporated herein in its entirety by reference.

TECHNICAL FIELD

The present invention relates to a delivery management system, a management server, a delivery management method, and a storage medium of a program.

BACKGROUND ART

Shop receipt services by which an article purchased on an electronic commerce (EC) site or the like can be received at a shop such as a convenience store are widely used. In such a service, a purchased article is distributed to a shop and temporarily stored at the backyard or the like of the shop. When the user comes to the shop and presents necessary information, a salesclerk finds a target article from the backyard and delivers the target article to the user.

CITATION LIST

Patent Literature

PTL 1: Japanese Patent Application Laid-Open No. 2001-323696

SUMMARY OF INVENTION

Technical Problem

A salesclerk has to find a target article from a number of articles in the backyard and thus is forced to have a heavy workload. To reduce a workload of a salesclerk, it is preferable that articles be displayed in an unlocked space and the user receive an article in a self-service manner. In such a case, however, a security problem such as theft occurs.

The present invention has been made in view of the problems described above and intends to provide a delivery management system that can ensure security.

According to one example aspect of the present invention, provided is a delivery management system including: an authentication unit that authenticates a user; a storage unit that stores identification information on an article stored in a storage area that is a target article associated with the user; and a control unit that, when an article carried out by the authenticated user from the storage area is the same as the target article, permits the user to exit the storage area.

According to one example aspect of the present invention, provided is a management server that transmits identification information on a target article to a delivery management system including an authentication unit that authenticates a user and a control unit that acquires identification information on an article stored in a storage area that is the target article associated with the user and, when the article carried out by the authenticated user from the storage area is the same as the target article, permits the user to exit the storage area.

According to another example aspect of the present invention, provided is a delivery management method including steps of: authenticating a user; storing identification information on an article stored in a storage area that is a target article associated with the user; and when an article carried out by the authenticated user from the storage area is the same as the target article, permitting the user to exit the storage area.

According to another example aspect of the present invention, provided is a storage medium of a program that causes a computer to perform steps of: authenticating a user; storing identification information on an article stored in a storage area that is a target article associated with the user; and when an article carried out by the authenticated user from the storage area is the same as the target article, permitting the user to exit the storage area.

Advantageous Effects of Invention

According to the present invention, a delivery management system that can ensure security is provided.

BRIEF DESCRIPTION OF DRAWINGS

FIG. 6 is a sequence chart illustrating an article distribution process according to the first example embodiment.

DESCRIPTION OF EMBODIMENTS

The example embodiments of the present invention will be described below with reference to the drawings.

First Example Embodiment

Figure 1:
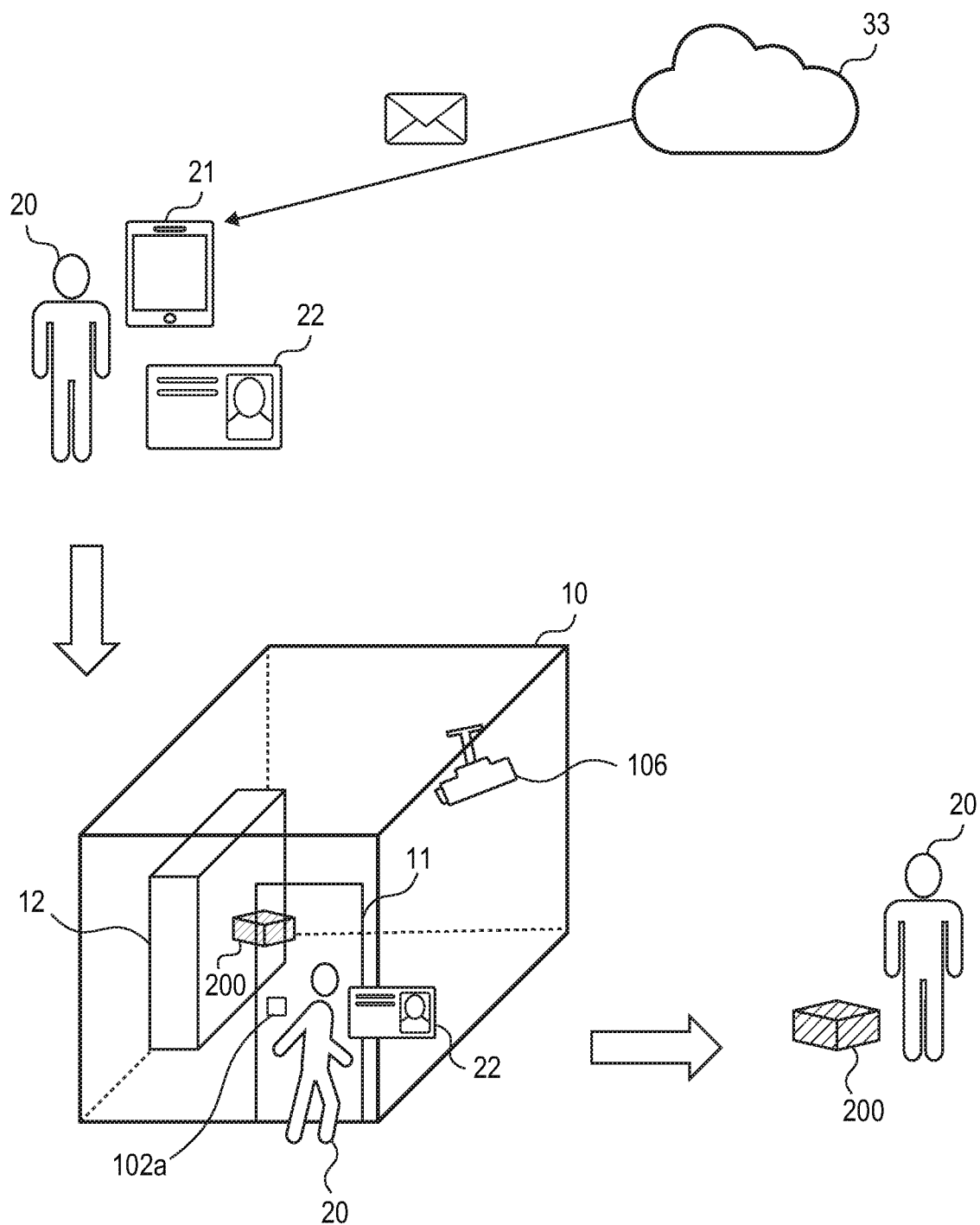
FIG. 1 is a diagram illustrating the outline of a delivery management system according to a first example embodiment.

FIG. 1 is a diagram illustrating the outline of a delivery management system according to the present example embodiment. The delivery management system according to the present example embodiment manages delivery of articles in a storage area in which a plurality of articles are stored. A storeroom 10 will be described below as one example of the storage area. The storeroom 10 is a container type facility and can be installed in the corner of a parking area of a shop such as a convenience store.

When purchasing an article on the EC site, the user can specify receipt at the storeroom 10 as a way to receive the article. The article specified to be received at the storeroom 10 is distributed to the storeroom 10 by a logistics company affiliated with the EC site. Upon completion of the distribution of the article to the storeroom 10, an electronic mail indicating the completion is transmitted from a company server 33 to a user terminal 21. The company server 33 is a cloud server operated by a logistics company, and the user terminal 21 is a portable information terminal such as a smartphone.

Once the electronic mail is received at the user terminal 21, a user 20 comes to the storeroom 10 with a user card 22 to receive the article. The user card 22 is a membership card issued by the logistics company in which information used for identifying the user 20 is registered. A card reader 201a is provided on a door 11 of the storeroom 10, and in response to the user 20 holding the user card 20 over the card reader 201a, the authentication of the user 22 is performed. In response to authentication of the user 20, the door 11 is unlocked, and entry to the storeroom 10 is allowed.

In response to the user 20 entering the storeroom 10, the door 11 is once locked in order to suppress wrong picking of an article. The user 20 takes out his/her own article 200 (target article) from the articles displayed in a shelf 12 in accordance with voice guidance. A shelf camera 106 is installed inside the storeroom 10, and an article taken out from the shelf 12 can be detected. When it is detected that an incorrect article that is not the target article is taken out, voice guidance is provided so that the user 20 takes out the target article.

Once it is confirmed that the user 20 has received the target article, the user 20 is permitted for exit. Accordingly, the door 11 can be unlocked. The door 11 is unlocked in response to the user 20 holding the user card 22 over the card reader 102a, and the user 20 takes out the target article and exits the storeroom 10.

Figure 2:
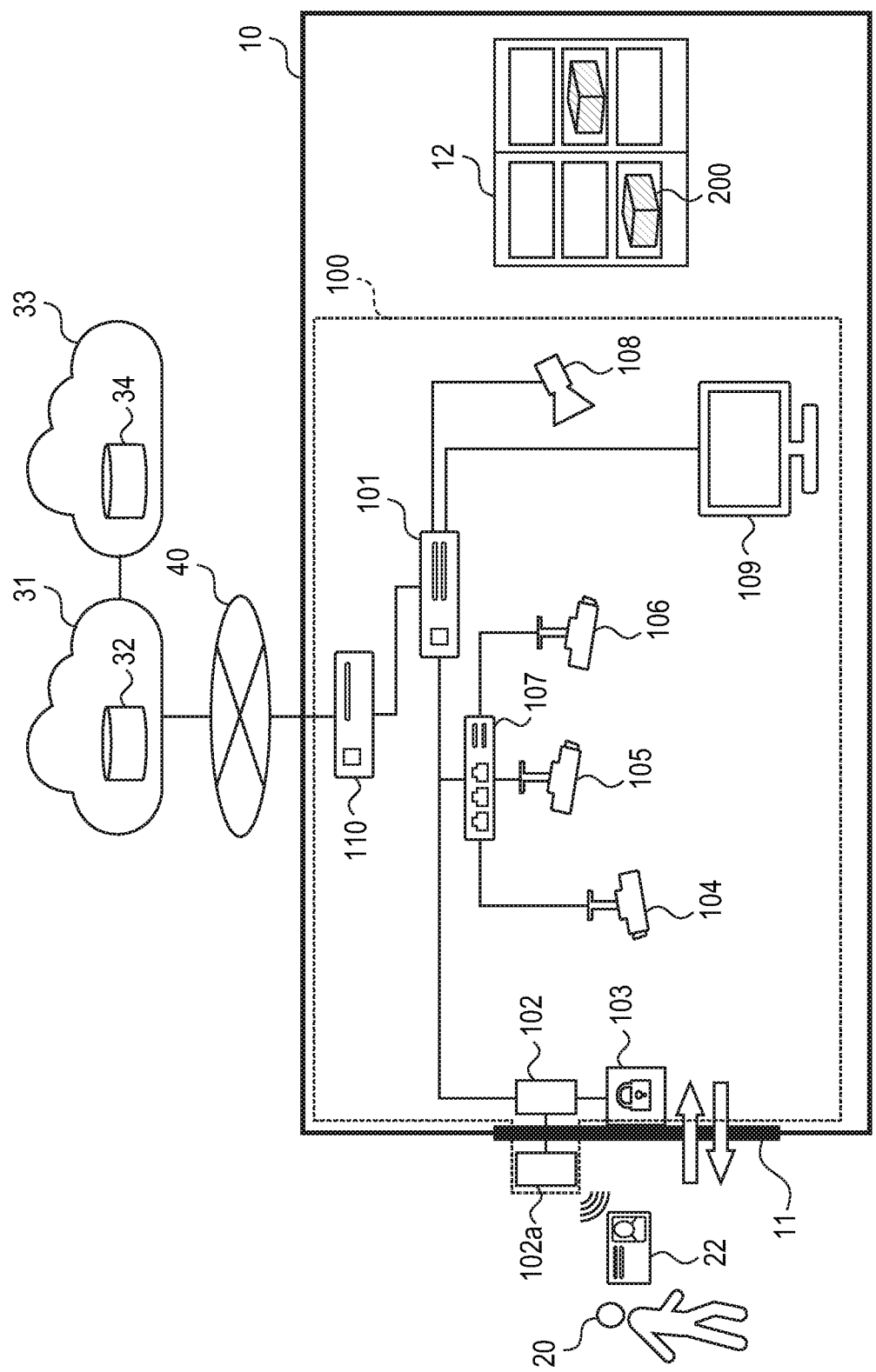
FIG. 2 is a schematic diagram illustrating an overall configuration of the delivery management system according to the first example embodiment.

FIG. 2 is a schematic diagram illustrating the overall configuration of the delivery management system according to the present example embodiment. A delivery management system 100 includes an edge gateway (GW) 101, a card reader unit 102, an electric lock 103, an authentication camera 104, a live camera 105, the shelf camera 106, a hub 107, an audio terminal 108, a display 109, and a router 110. The edge GW 101, the card reader unit 102, the authentication camera 104, the live camera 105, the shelf camera 106, the hub 107, the audio terminal 108, the display 109, and the router 110 are installed inside the storeroom 10. The electric lock 103 is installed integrally with the door 11 that is an entrance of the storeroom 10. Further, a shelf 12 used for arranging a plurality of articles 200 is installed inside the storeroom 10.

The edge GW 101 is a computer device that integrally controls the delivery management system. The edge GW 101 collects data from the card reader unit 102, the authentication camera 104, the live camera 105, and the shelf camera 106 and performs processing, analysis, or the like on the collected data. The collected data is transmitted from the edge GW 101 to a management server 31 via the router 110. Further, the edge GW 101 can also transmit information to the user via the audio terminal 108 or the display 109.

The card reader unit 102 is a non-contact type card reader and reads the user card 22 by using wireless communication such as Near Field Communication (NFC), for example. An integrated circuit (IC) card can be used as the user card 22. The card reader unit 102 may be any device that can read the identification information on the user 20 and may be configured to read user identity module (UIM) information on the user terminal 21, for example.

The card reader unit 102 has a card reader, a built-in memory, and a controller. The card reader has a reading face where the user card 22 is held over. Information (permission information) on the user 20 who is permitted to enter or exit the storeroom 10 is registered in advance in the built-in memory. The controller performs authentication of the user 20 by comparing the information of the user card 22 read by the card reader (card information) with permission information. In response to authenticating the user 20, the controller outputs an unlock signal to the electric lock 103.

Further, the card reader unit 102 has a card reader 102a as a slave unit. The card reader 102a has the same function as the card reader provided in the card reader unit 102. The card reader 102a (the slave unit) is installed outside the door 11, and the card reader unit 102 (the master unit) is installed inside the door 11. That is, the card reader 102a is used for entry, and the card reader unit 102 is used for exit. The card reader unit 102 may function as an authentication unit.

The electric lock 103 is formed of an actuator such as a solenoid, a dead bolt (a gate bar) that can be moved by the actuator, an open/close sensor, or the like, for example. The electric lock 103 enables the door 11 to be opened and closed by moving the position of the dead bolt in response to an unlock signal from the card reader unit 102. Further, the electric lock 103 can also detect opening or closing of the door 11 in accordance with a signal from the open/close sensor. Note that the electric lock 103 is always locked and can be unlocked only when the user 20 is authenticated by the card reader unit 102.

The authentication camera 104 is a network camera used for face matching and is used to acquire a face image of the user who has entered the room. The authentication camera 104 is connected to the edge GW 101 via the hub 107, and captured image data (face image) is stored in the edge GW 101. The edge GW 101 can extract a face part of the user from image data and perform identity verification in real time based on a face image registered in advance for matching.

The live camera 105 is a network camera for monitoring and is used for capturing a moving image of behavior of the user who has entered the room. The live camera 105 is connected to the edge GW 101 via the hub 107, and the captured image data (live image) is stored in the edge GW 101. The image data may be stored in a predetermined file format in order to prevent falsification.

The shelf camera 106 is a network camera used for checking a shelf and is used for capturing the entire shelf 12 and detecting the arrangement of articles accommodated in the shelf 12. The shelf camera 106 is connected to the edge GW 101 via the hub 107, and the captured image data (shelf image) is stored in the edge GW 101. The shelf camera 106 has a wide angle of view that is greater than or equal to 100 degrees, for example, and can capture the entire shelf 12 in one frame. Further, the shelf camera 106 can capture a full high definition (HD) image of 1920 by 1080 pixels, for example, and can record information (a shelf label, a voucher, or the like) attached to the shelf 12 and the article 200 with high image quality. The authentication camera 104, the live camera 105, and the shelf camera 106 may each function as an image capture unit.

The hub 107 is an interface unit based on a communication standard such as Ethernet (registered trademark), for example, and connects the edge GW 101, the authentication camera 104, the live camera 105, and the shelf camera 106 to each other.

The audio terminal 108 is a speaker, for example, and is used for providing voice guidance to the user who has entered the storeroom 10. The audio terminal 108 is connected to the edge GW 101 and outputs voice in accordance with audio data from the edge GW 101. In addition to a speaker, the audio terminal 108 may be a robot type device that can perform communication by voice.

The display 109 is a liquid crystal display or an organic electro luminescence (EL) display, for example, and is used for providing guidance with an image to the user who has entered the storeroom 10. The display 109 is connected to the edge GW 101 and performs display in accordance with image data from the edge GW 101. The display 109 displays the position of the article 200 in the shelf 12 by animation, for example. The display 109 may be configured to provide guidance in cooperation with the audio terminal 108. Further, the display 109 may be a touchscreen and also capable of accepting touch input by the user.

The router 110 has a 3rd generation (3G)/long term evolution (LTE) module, a wireless local area network (LAN), or the like to establish a connection to the management server 31 via the network 40 and control data communication between the edge GW 101 and the management server 31. The router 110 may be connected to the network 40 by a wire or may be built in the edge GW 101.

The management server 31 is a so-called cloud server and connected to the edge GW 101 via the network 40 and the router 110. The management server 31 can transmit and receive data to and from the company server 33 by utilizing application programming interface (API). The management server 31 has a data base (DB) 32, and the data base 32 stores a card usage history, a shelf image, a live image, or a face image received from the edge GW 101, information received from the company server 33, and the like.

The company server 33 is a so-called cloud server and can transmit and receive data to and from the management server 31 by utilizing the API. The company server 33 is operated by a logistics company to manage personal information registered in the user card 22, article information indicating the association between the user and the article, the distribution status of the article, or the like. Note that the number of the company servers 33 is not limited, and a plurality of different company servers may be installed on the cloud.

The network 40 is the Internet, for example, and also includes a mobile communication network such as LTE, a base station, or a relay server. In addition to the user terminal 21, a delivery person terminal such as a smartphone or a tablet computer operated by a delivery person of a logistics company may be connected to the network 40.

Figure 3:
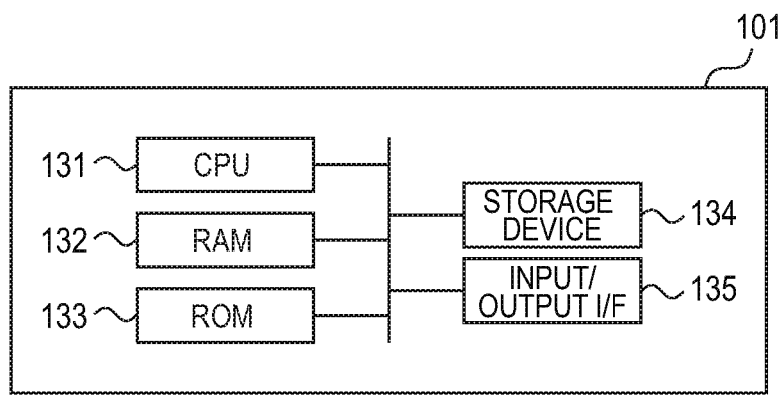
FIG. 3 is a hardware block diagram of an edge gateway according to the first example embodiment.

FIG. 3 is a hardware block diagram of the edge GW according to the present example embodiment. The edge GW 101 has a central processing unit (CPU) 131, a random access memory (RAM) 132, a read only memory (ROM) 133, a storage device 134, and an input/output interface (I/F) 135. The CPU 131 controls devices connected to the edge GW 101 and performs a predetermined process such as collection, edition, analysis, or the like of data in accordance with a program stored in the ROM 133 or the storage device 134.

The RAM 132 is formed of a volatile memory and provides a memory region required for the operation of the CPU 131. The ROM 133 is formed of a non-volatile memory and stores a program, data, or the like required for operating the edge GW 101. The storage device 134 is a solid state drive (SSD), a hard disk drive (HDD), or the like and stores an application program used for image recognition, audio data and image data used for guidance, or the like in advance. Further, the storage device 134 stores a card usage history, a shelf image, a live image, a face image, purchase information, or the like as required. The CPU 131, the RAM 132, and the ROM 133 function as control units, and the storage device 143 may function as a storage unit.

The input/output I/F 135 is a wired interface based on a standard such as the Universal Serial Bus (USB), the Ethernet, RS-232C, RS-485, or the like and is connected to the card reader unit 102, the hub 107, the audio terminal 108, the display 109, and the router 110. The input/output I/F 135 can be connected to any device and may be connected to a motion sensor, a microphone, a temperature/humidity sensor, a sensor used for detecting malfunction of a device, or the like, for example.

Note that the hardware configuration illustrated in FIG. 3 is an example, and devices other than the above may be added, or some devices may be not provided. The edge GW 101 may realize a part of the function of the card reader unit 102, or a part of the function of the edge GW 101 may be provided by another device, for example.

Figure 4:
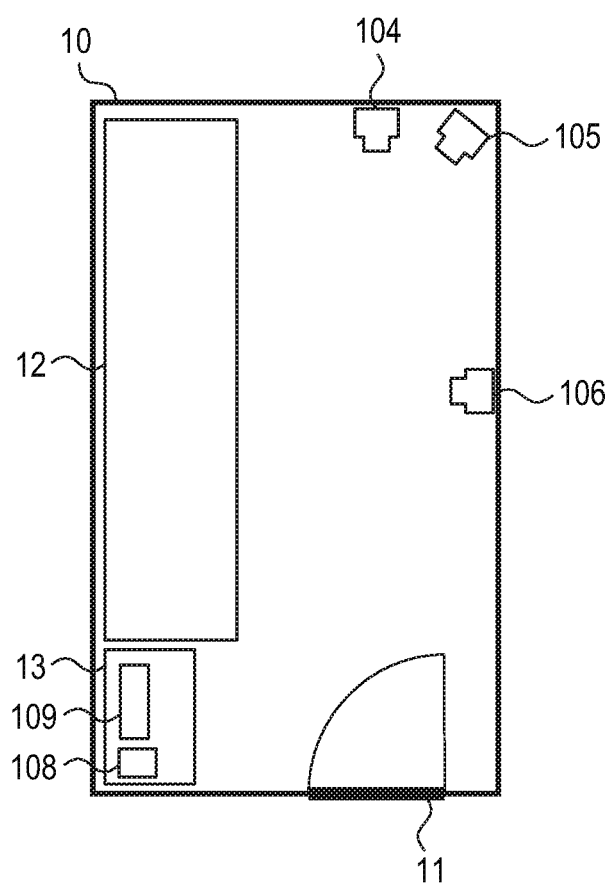
FIG. 4 is a plan view of a storeroom according to the first example embodiment.

FIG. 4 is a plan view of the storeroom according to the present example embodiment. The storeroom 10 is a unit house having an area of approximately 10 m², for example, and is provided with the door 11 as a single entrance. The door 11 is locked by the electric lock 103, and only the authorized user 20 can enter and exit the room. Inside the storeroom 10, the shelf 12 used for arranging a plurality of articles is installed along the wall of the storeroom 10. A guide table 13 is installed near the shelf 12, and the audio terminal 108 and the display 109 are placed on the guide table 13. The guide table 13 is installed in front of the shelf 12 when viewed from the door 11 side so that the user 20 easily views the display 109 when entering the storeroom 10 through the door 11.

The authentication camera 104 is installed on the top of a wall facing the wall on which the door 11 is installed, for example, so as to face the door 11. By installing the authentication camera 104 in front of the door 11, it is possible to reliably capture the user 20 who enters the room. The live camera 105 is installed on the top of the corner of the storeroom 10 or the like so as to capture the entire storeroom 10 in the angle of view. The shelf camera 106 is installed on a wall facing the front of the shelf 12 or the like so that the entire shelf 12 is captured in the angle of view.

A clock may be further installed in the storeroom 10 within the angle of view of the live camera 105. By utilizing the clock, an operator who monitors an image from the live camera 105 can easily confirm that the live camera 105 is operating normally. Furthermore, when an identification number (location code) of the storeroom 10 is indicated near the clock, the installation place of the storeroom 10 can be immediately recognized, which facilitates an action when an anomaly occurs.

Figure 5A:
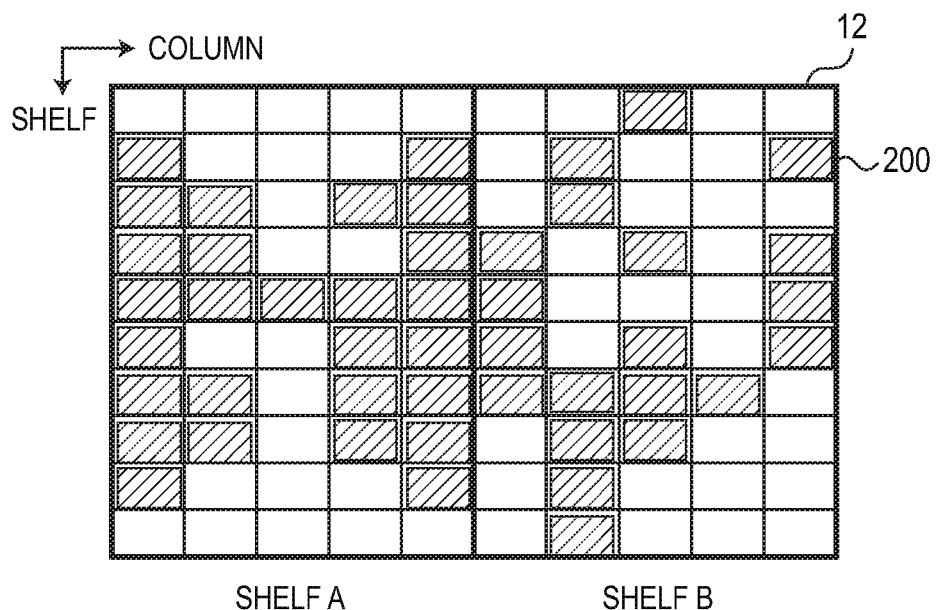
FIG. 5A is a front view of shelfs according to the first example embodiment.
Figure 5B:
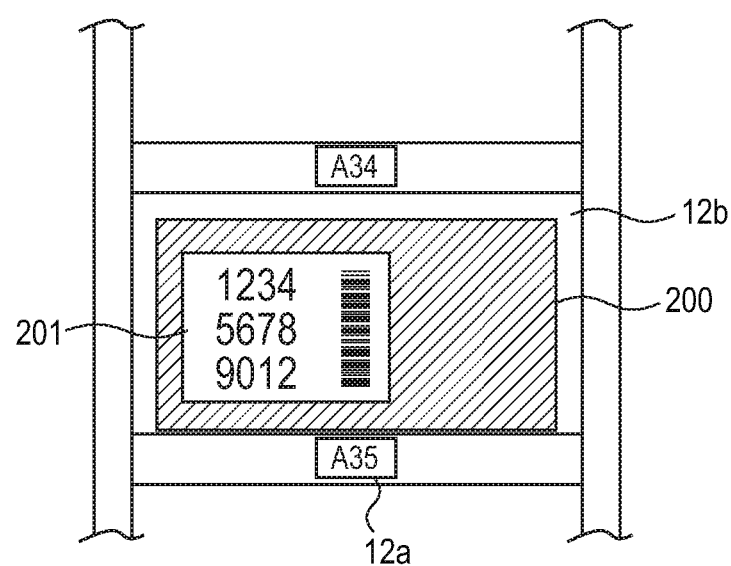
FIG. 5B is a front view of the shelf according to the first example embodiment.

FIG. 5A and FIG. 5B are front views of the shelf according to the present example embodiment. FIG. 5A is a front view of the entire shelf 12, and FIG. 5B is an enlarged view in which one section of the shelf 12 is enlarged. As illustrated in FIG. 5A, the shelf 12 is partitioned into 10 columns and 10 shelves in the horizontal direction and the vertical direction, respectively. Each partitioned section can accommodate one article, and the entire shelf 12 can accommodate at most 100 articles.

The size of each section of the shelf 12 may be designed in accordance with the standard for cardboard boxes for packaging used by a logistics company. That is, in accordance with the standard such as Size 60, Size 80, or the like that is popularly used in logistics, the size of each section may be slightly larger than the standard for the boxes. The size of each section may have a width of 27 cm, a height of 19 cm, and a depth of 32 cm, for example.

While the shelf 12 is formed of a shelf A and a shelf B partitioned in the same size in the example of FIG. 5A, the size of each section of the shelf A may be designed in accordance with Size 60 while the size of each section of the shelf B may be designed in accordance with Size 80, for example. Further, to accommodate an article packed in a larger box, some partitions of the shelf 12 may be removable, and one article may be accommodated by using a plurality of sections.

FIG. 5B illustrates the article 200 accommodated in a section on the fifth shelf in the third column of the shelf 12. A shelf label 12a represented by a combination of a column number and a shelf number of the shelf 12 is attached to each section. A shelf label 12a in which "A35" is written is attached to a section on the fifth shelf in the third column of the shelf A, for example. Further, a back plate 12b of each section of the shelf 12 is preferably painted in black or the like so as to facilitate image detection of the article 200.

A voucher 201 used for identifying each article is provided on the side face of each box of all the articles 200 arranged in the shelf 12. For an article that was specified, at the time of the order on the EC site, to be received at the delivery space (the storeroom 10), the voucher 201 is attached at the time when the article 200 is shipped. Further, for an article that was specified, at the time of the order, to be received at home but is changed to be received at the storeroom 10 due to a reason such as absence of the recipient, the voucher 201 is attached by the delivery person when the article is stored in the storeroom 10. For example, the delivery person carries a compact printer that can make the voucher 201 based on a barcode and may cause the printer to read the barcode of the original voucher attached to the article 200 to create the voucher 201 at the place.

A voucher number and a barcode are printed on the voucher 201. The voucher number is identification information of the article 200 and made of a 12-digit number, for example. The voucher number is formed in any format and may include both one or more numbers and one or more letters. To reduce false detection in image recognition, the shelf label 12a may be represented by letters only, and the voucher number may be represented by numbers only. A destination (recipient) name, an EC site order number, a location code, or the like may be further printed on the voucher 201.

FIG. 6 is a sequence chart illustrating an article distribution process according to the present example embodiment. The sequence chart illustrates a process from purchase of the article to completion of preparation for receipt of the article 200. First, the user 20 accesses the EC site managed by the EC server 41 from a personal computer at home, the user terminal 21, or the like to purchase the article 200 on the EC site (step S11). At the time of purchase, it is assumed that the storeroom 10 is specified by the user 20 as a place for receipt of the article 200.

The EC server 41 transmits purchase information including the purchased article 200, the user 20 who made a purchase, the specified storeroom 10, or the like to the company server 33 (step S12). The company server 33 stores the purchase information from the EC server 41 in a database 34 and transmits the purchase information together with the voucher number of the article 200 to the management server 31 (step S13). The management server 31 stores information from the company server 33 in the database 32. When there is no vacancy in the shelf 12 of the storeroom 10, the management server 31 returns an NG notification to the company server 33 (step S14). The company server 33 that has received the NG notification temporarily holds the distribution of the article 200 until the shelf 12 of the storeroom 10 is available. The company server 33 may transmit, to the user terminal 21, a mail or the like requesting a change of the place for receipt.

After accommodating the article 200 in the shelf 12 of the storeroom 10, the delivery person notifies the company server 33 of the completion of distribution from the delivery person terminal or the like. From the notification received from the delivery person, the company server 33 confirms that the distribution of the article 200 to the storeroom 10 is completed (step S15). In response to completion of the distribution being confirmed, the company server 33 transmits the distribution status of the article 200 ("distributed", for example) to the management server 31 (step S16). Further, the company server 33 transmits, to the user terminal 21, an electronic mail (arrival notification mail) indicating that the article 200 has arrived at the storeroom 10 (step S17). The user 20 who has received the arrival notification mail can access a site managed by the management server 31 by using a link indicated in the arrival notification mail, for example, and specify the date and time of receipt of the article 200 at the user terminal 21 (step S18). The specification of the date and time of receipt may be omitted.

Figure 7:
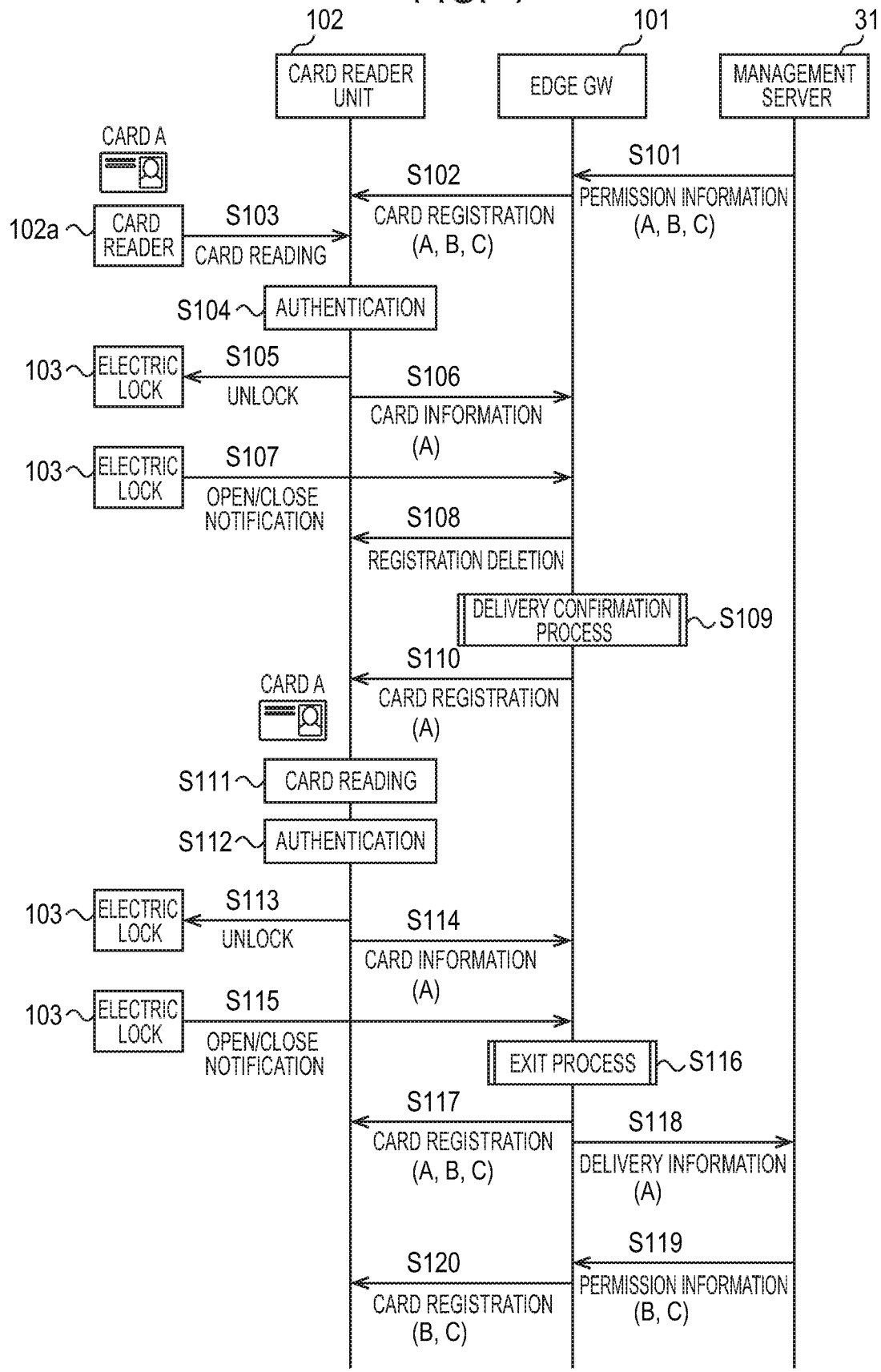
FIG. 7 is a sequence chart illustrating an article delivery process according to the first example embodiment.

FIG. 7 is a sequence chart illustrating an article delivery process according to the present example embodiment. This sequence chart illustrates a process after preparation for receiving the article 200 is completed and before the article 200 is received by the user 20. A case where articles of different users A, B, and C are stored in the storeroom 10 and the user A receives a target article will be described below as an example. Further, the user cards 22 (cards A, B, and C) in which identity authentication information is stored have been issued in advance to respective users.

First, the management server 31 transmits permission information on the users A, B, and C, which are recipients of articles stored in the storeroom 10, to the edge GW 101 (step S101). The permission information includes card information, storeroom information, a voucher number, and a date and time of receipt, for example. The card information is an ID of the user card 22, and the storeroom information is an identification number, a location code, or the like of the storeroom 10. The voucher number is a voucher number of a target article associated with each user, and the date and time of receipt is a date and time specified by the user in step S18 of FIG. 6.

The edge GW 101 registers card information in the card reader unit 102 based on permission information received from the management server 31 (step S102). For example, the edge GW 101 registers IDs of the cards A, B, and C to the card reader unit 102. When a date and time of receipt is specified, registration and deletion of card information are performed in accordance with a date and time.

The user A who received an arrival notification mail (see step S17 of FIG. 6) visits the storeroom 10 and holds the card A over the card reader 102a, and the card reader 102a then transmits the read authentication information (ID of the card A) to the card reader unit 102 (step S103). The card reader unit 102 matches the read authentication information with registered card information (IDs of cards A, B, and C) to perform authentication of the user A (step S104).

Once the user A is authenticated, the card reader unit 102 transmits an unlock signal to the electric lock 103 (step S105). This causes the electric lock 103 to be unlocked, and the door 11 can be opened and closed. The card reader unit 102 transmits the card information of the authenticated user A to the edge GW 101 (step S106). When opening or closing of the door 11 is not detected for a certain time period (for example, 5 seconds), the electric lock 103 is automatically locked. When the electric lock 103 is unintendedly unlocked before entry of the user A, re-authentication is enabled by the user A holding the card A over the card reader 102a again.

Once the user A opens the door 11, the electric lock 103 detects opening or closing of the door 11 and transmits an open/close notification to the edge GW 101 (step S107). The open/close notification may be performed via the card reader unit 102. Further, open/close detection may be performed by an open/close sensor provided to the door 11. In response to receiving the open/close notification of the door 11, the edge GW 101 deletes all the card information registered in the card reader unit 102 (step S108).

Subsequently, the edge GW 101 performs a receipt confirmation process (step S109). Reception of the article 200 is confirmed by the receipt confirmation process, and exit of the user A is permitted. The edge GW 101 registers card information of the user A permitted for exit (ID of the card A) to the card reader unit 102 (step S110). Once the user A holds the card A over the card reader unit 102, the card reader unit 102 reads authentication information stored in the card A (ID of the card A) (step S111). The card reader unit 102 matches the read authentication information with registered card information (ID of the card A) to perform authentication of the user A (step S112).

Once the user A is authenticated, the card reader unit 102 transmits an unlock signal to the electric lock 103 (step S113). This causes the electric lock 103 to be unlocked, and the door 11 can be opened or closed. The card reader unit 102 transmits the card information of the authenticated user A to the edge GW 101 (step S114). When opening or closing of the door 11 is not detected for a certain time period (for example, 5 seconds), the electric lock 103 is automatically locked. When the electric lock 103 is unintendedly unlocked before exit of the user A, re-authentication is enabled by the user A holding the card A over the card reader unit 102 again.

Once the user A opens the door 11, the electric lock 103 detects opening or closing of the door 11 and transmits an open/close notification to the edge GW 101 (step S115). In response to receiving the open/close notification of the door 11, the edge GW 101 performs an exit process (step S116).

After the exit process, the edge GW 101 registers the card information of the user A who has already received an article to the card reader unit 102 in addition in the card information of the users B and C who have not yet received articles (step S117). Thereby, even when having left something behind in the storeroom 10, the user A is able to enter the storeroom 10 again by holding the card A over the card reader 102a. To notify the user A of the completion of delivery of the article 200, the edge GW 101 transmits the card information of the user A to the management server 31 (step S118).

After confirming the completion of delivery of the article 200 to the user A, the management server 31 transmits, to the edge GW 101, permission information on the users B and C for which delivery has not yet confirmed (step S119). The edge GW 101 registers the card information of the user B and C in the card reader unit 102 based on the permission information (step S120). The process of steps S119 and S120 is performed at a predetermined cycle (for example, every 15 minutes). Thereby, the card information registered in the card reader unit 102 is updated to the latest state. For example, when an article of the user D is newly distributed to the storeroom 10, card information of the user D is added and registered in the card reader unit 102.

Figure 8:
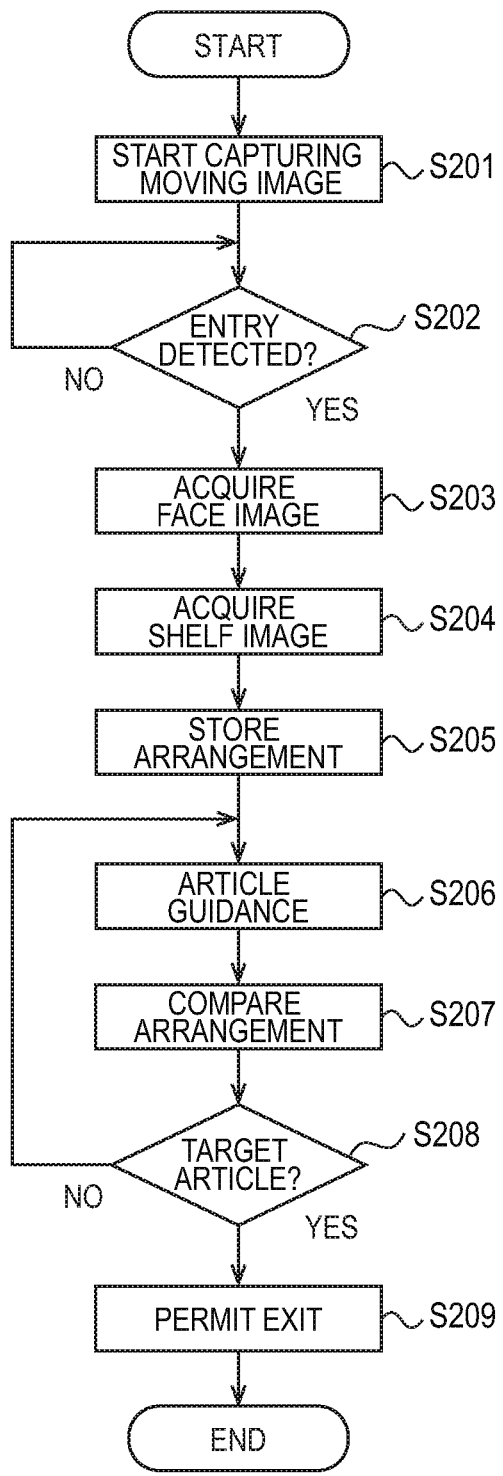
FIG. 8 is a flowchart illustrating details of a receipt confirmation process according to the first example embodiment.

FIG. 8 is a flowchart illustrating details of a receipt confirmation process according to the present example embodiment. First, the edge GW 101 starts capturing a moving image by using the live camera 105 (step S201) and determines whether or not entry of the user A is detected (step S202). For example, the edge GW 101 performs motion detection by analyzing image data from the live camera 105. The live camera 105 may have a function of motion detection. Further, a motion sensor or the like may be provided inside the storeroom 10. Note that, without being limited to a moving image, the edge GW 101 may acquire static images captured at predetermined intervals from the live camera 105.

If entry is not detected (step S202, NO), the edge GW 101 stands by until entry is detected. If entry is detected (step S202, YES), the edge GW 101 acquires a face image of the incoming user A by using the authentication camera 104 (step S203). The edge GW 101 performs face matching of the user A based on a face image registered in advance in the storage device 134. When the user A uses the storeroom 10 for the first time, the edge GW 101 registers the acquired face image in the storage device 134. The acquired face image may be stored in the storage device 134, and face matching may be performed if necessary.

Subsequently, the edge GW 101 acquires a shelf image by using the shelf camera 106 (step S204). Here, the acquired shelf image is an image of the shelf 12 immediately after the user A enters the storeroom 10, which indicates a state before the article 200 arranged in the shelf 12 is received by the user A. The process from steps S201 to step S204 is not necessarily performed sequentially and may be performed in parallel.

The edge GW 101 stores the arrangement of all the articles 200 accommodated in the shelf 12 based on a shelf image (step S205). For example, the edge GW 101 reads information on the voucher 201 and the shelf label 12a by using an image recognition technology such as optical character recognition (OCR) and stores voucher numbers of the articles 200 in the storage device 134 in association with the shelf label 12a. That is, the list of the articles 200 accommodated in the shelf 12 is created.

Next, the edge GW 101 directs the incoming user A about the position of the article 200 (step S206). For example, the edge GW 101 performs an announcement such as "baggage is on the second shelf in the first column of shelf A. Please look at the screen for details" by using the audio terminal 108 and displays the layout of the shelf 12 and the position of the article 200 by using the display 109. The user A confirms the position of the article 200 displayed on the display 109 in accordance with voice guidance. The user A then moves to the front of the shelf 12 and takes out the article 200 from the shelf 12.

Figure 10A:
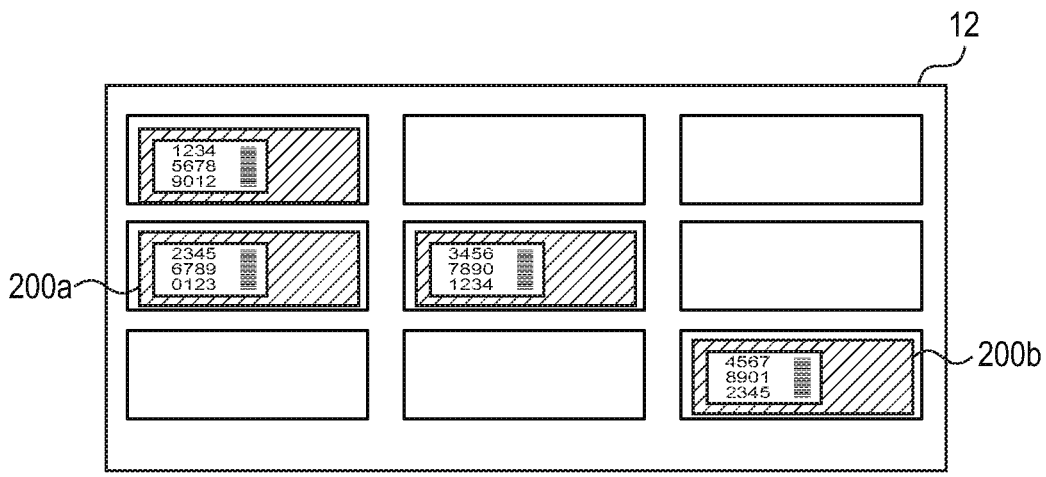
FIG. 10A is an example of comparison of the article arrangement according to the first example embodiment.
Figure 10B:
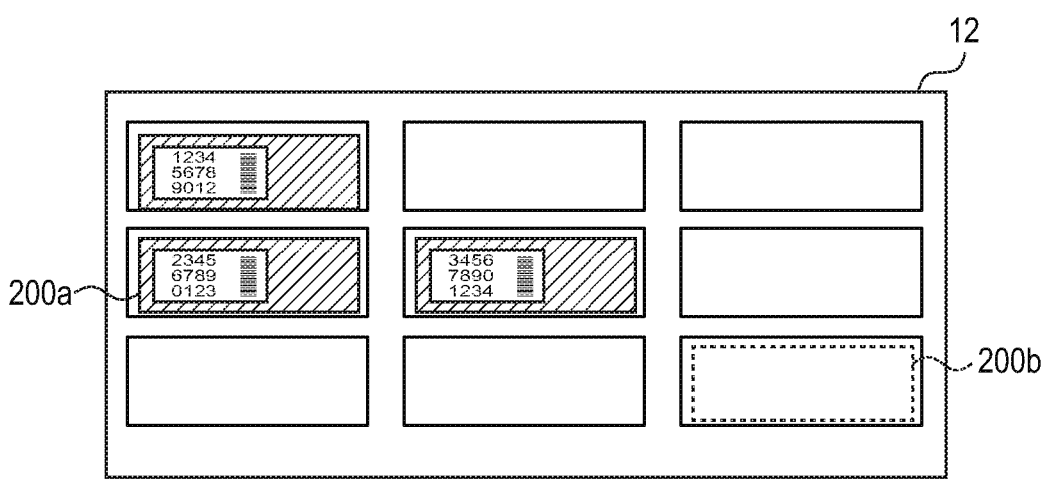
FIG. 10B is an example of comparison of the article arrangement according to the first example embodiment.
Figure 10C:
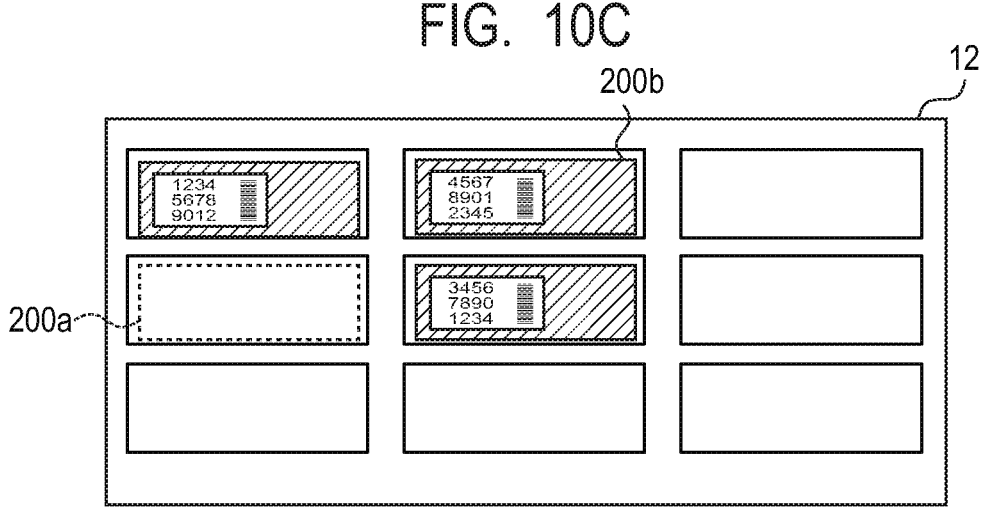
FIG. 10C is an example of comparison of the article arrangement according to the first example embodiment.

Subsequently, the edge GW 101 performs an announcement such as "please confirm the name written in a voucher of the baggage. Please press the confirmation button on the screen if correct". The user A confirms that the taken out article is the article of interest (for example, the item that the user A purchased on an EC site) and operates a confirmation button displayed on the display 109. In response to the operation on the confirmation button, the edge GW 101 compares the arrangement of the articles 200 in the shelf 12 (step S207). The edge GW 101 acquires a shelf image after the article 200 is taken out (hereafter, referred to as an image after takeout) from the shelf camera 106 and generates a difference image between the image after takeout and a shelf image acquired before the article 200 is taken out (that is, acquired at the time of entry or in step S207 of the previous loop) (hereafter, referred to as an image before takeout). Then, based on the difference image, the edge GW 101 detects which article 200 accommodated on which position of the shelf 12 has been taken out. For example, as position information on the taken out article 200, a column number and a shelf number of the shelf 12 are acquired. The edge GW 101 acquires a voucher number of the article 200 by using the list of the articles 200 stored in the storage device 134 and thereby identifies the taken out article 200. Based on the permission information, the edge GW 101 can determine whether or not the user associated with the voucher number of the identified article 200 is the same as the user A authenticated by the authentication process (step S104 of FIG. 7). FIG. 10A to FIG. 10C illustrate an example of comparison of the article arrangement.

FIG. 10A is a shelf image at the time of entry. The article 200*a* of the user A is arranged on the second shelf in the first column of the shelf 12. Further, the article 200*b* of the user B is arranged on the third shelf in the third column of the shelf 12. FIG. 10B is a shelf image after the article is taken out and illustrates a case where the user A has wrongly taken out the article 200*b* of the user B. In such a case, the edge GW 101 detects the article 200*b* from a difference image between FIG. 10A and FIG. 10B. Since the voucher number of the detected article 200*b* is not the same as the voucher number of the article 200*a* that is the article of interest, the edge GW 101 then performs an announcement such as "You took wrong baggage. Please return the baggage". The user A returns the article 200*b* to the shelf 12 in accordance with the announcement and takes out the correct article 200*a* from the shelf 12. The user A again operates the confirmation button displayed on the display 109. The edge GW 101 acquires a shelf image by using the shelf camera 106 and again compares the arrangement of the articles 200. FIG. 10C is a shelf image after the correct article 200*a* is taken out. The edge GW 101 detects the article 200*a* taken out from the shelf 12 based on a difference image between FIG. 10A and FIG. 10C. Since the voucher number of the detected article 200*a* is the same as the voucher number of the target article, the edge GW 101 can determine that the target article has been correctly received. Note that, since the edge GW 101 can recognize the change of the position of the article 200*b* based on a difference image from FIG. 10A to FIG. 10C, the wrongly taken out article 200*b* may be returned to a different place from the original place.

In accordance with the comparison of article arrangement as described above, the edge GW 101 determines whether or not the article received by the user A is the target article (that is, the article 200*a*) (step S208). If the article received by the user A is not the target article (FIG. 10B) (step S208, NO), the edge GW 101 returns to the article guide process (step S206). If the article received by the user A is the target article (FIG. 10C) (step S208, YES), the edge GW 101 permits exit of the user A (step S209). The edge GW 101 performs an announcement such as "Thank you for your cooperation. Please hold your card over and exit" by using the audio terminal 108.

Note that the edge GW 101 may acquire a shelf image at any timing and confirm the arrangement of articles while the user 20 is in the room. That is, the edge GW 101 can detect that an article is taken out from the shelf 12 and determines whether or not the taken out article is the target article without the user 20 performing confirmation on the display 109.

Further, in step S207, in the similar manner to the process at entry, the edge GW 101 may acquire a shelf image by using the shelf camera 106 and read information of the voucher 201 and the shelf label 12*a* to create a list of the articles 200 accommodated in the shelf 12. The edge GW 101 compares a list of the articles 200 created and stored at the time of entry (first list) with a newly created list of the articles 200 (second list) and matches the voucher numbers between the lists and thereby can recognize the article 200 which is not included in the second list out of the articles 200 included in the first list. The edge GW 101 determines that the article 200 not included in the second list is taken out from the shelf 12 by the user 20. Further, when pieces of information of the shelf labels 12*a* associated with the same voucher number are different between the lists, the edge GW 101 determines that the article 200 of the voucher number was moved by the user 20.

Figure 9:
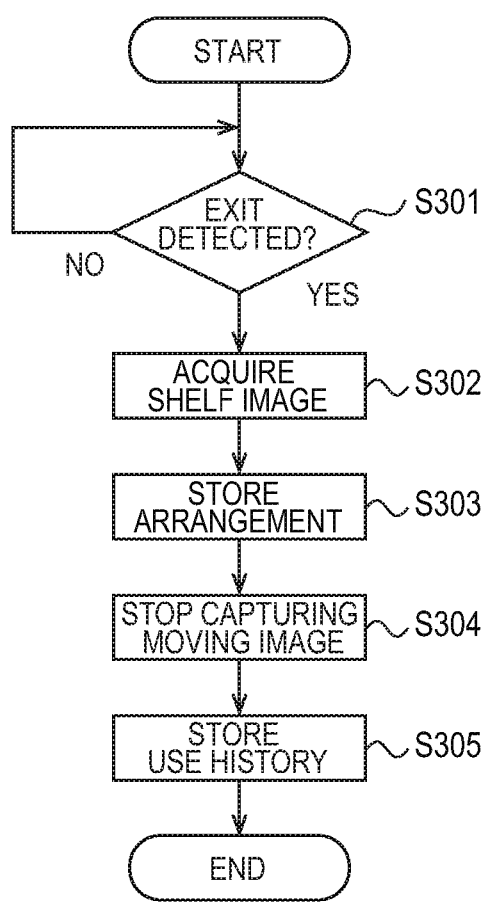
FIG. 9 is a flowchart illustrating details of an exit process according to the first example embodiment.

FIG. 9 is a flowchart illustrating details of an exit process according to the present example embodiment. First, the edge GW 101 determines whether or not exit of the user A is detected by using the live camera 105 (step S301). If exit is not detected (step S301, NO), the edge GW 101 stands by until exit is detected. If exit is detected (step S301, YES), the edge GW 101 acquires a shelf image of the shelf 12 by using the shelf camera 106 (step S302). Here, the acquired shelf image is an image of the shelf 12 immediately after the user A has exited the storeroom 10 and illustrates a state after the article 200*a* arranged in the shelf 12 has been taken out by the user A.

The edge GW 101 stores the arrangement of all the articles 200 accommodated in the shelf 12 based on the shelf image (step S303). The edge GW 101 reads information of the voucher 201 and the shelf label 12*a* and stores the information of the voucher 201 of the article 200 in the storage device 134 in association with the shelf label 12*a*. Further, the edge GW 101 stops capturing a moving image by the live camera 105 (step S304).

Finally, the edge GW 101 stores a use history for the user A in the storage device 134 (step S305). The use history includes information on the card A (ID of the user card 22) or entry time and exit time, for example. Furthermore, the edge GW 101 also stores, in the storage device 134, data such as a shelf image at the time of entry or exit, article arrangement in the shelf 12 acquired from the shelf image, a moving image from the time of entry to the time of exit, or the like. The moving image is stored as a file on a minute basis, for example. Furthermore, the edge GW 101 transmits data such as a use history, article arrangement, a moving image, or the like stored in the storage device 134 to the management server 31. Such data may be transmitted to the management server 31 upon a request by the management server 31.

According to the present example embodiment, when an article carried out by the user 20 from the shelf 12 of the storeroom 10 and a target article associated with the user 20 are matched, exit from the storeroom 10 by the user 20 is permitted. Accordingly, it is possible to suppress the user 20 from carrying out a wrong article from the storeroom 10, and this enables unmanned management of delivery of articles. The conventional delivery box is required to provide a lock mechanism for each box in which an article is accommodated and thus is expensive. In contrast, according to the present example embodiment, since a lock mechanism can be provided to the storeroom 10 in which a number of articles are stored, the system can be configured relatively inexpensively. Further, since the storeroom 10 can be installed outside a shop, it is possible to avoid a reduction of the space of a selling area. Furthermore, unlike the delivery box, since it is possible to accommodate an article in a simple shelf, it is possible to efficiently store a number of articles.

Second Example Embodiment

A delivery management system according to present example embodiment enables management of delivery even when the same types of articles 200 are stored in the storeroom 10. In this example embodiment, an example in which the articles 200 are box lunches reserved and sold at a shop such as a convenience store will be described. Features different from those of the first example embodiment will be mainly described below.

Figure 11A:
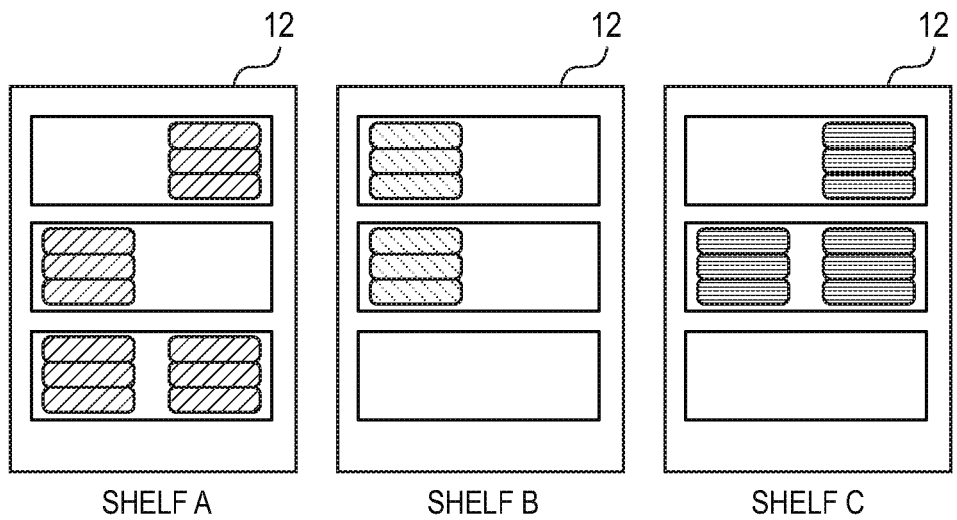
FIG. 11A is an example of comparison of the article arrangement according to a second example embodiment.
Figure 11B:
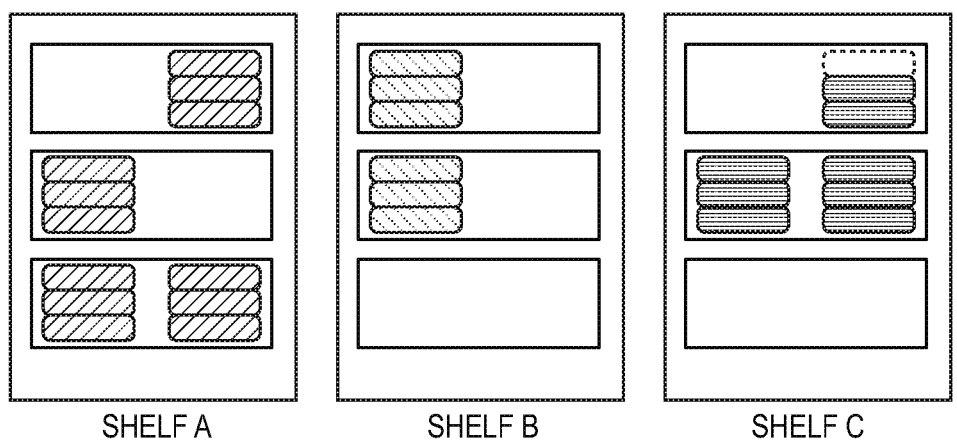
FIG. 11B is an example of comparison of the article arrangement according to the second example embodiment.
Figure 11C:
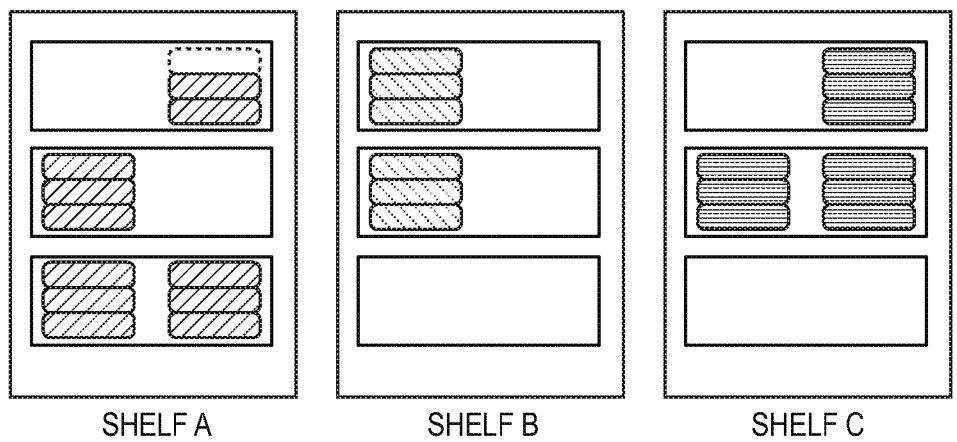
FIG. 11C is an example of comparison of the article arrangement according to the second example embodiment.

FIG. 11A to FIG. 11C illustrate an example of comparison of shelf images according to the present example embodiment. The shelf 12 includes shelves A to C, and different types of box lunches are displayed in the shelves A to C, respectively. That is, the same type of box lunches (box lunches A, box lunches B, and box lunches C, respectively) are displayed in each shelf. FIG. 11A is a shelf image at the time of entry. The edge GW 101 can acquire the arrangement and the number of box lunches in each shelf based on a shelf image. It is assumed below that the user A comes to receive a reserved and purchased box lunch A. For the user A who has entered the storeroom 10, the edge GW 101 performs an announcement such as "please take out a box lunch in the shelf A. All the box lunches are the same".

FIG. 11B is a shelf image after a box lunch was taken out from the shelf 12 and illustrates a case where the user A wrongly took out a box lunch C. In such a case, the edge GW 101 performs an announcement such as "you took a wrong box lunch. Please return the taken box lunch to the same shelf and take out a box lunch from the shelf A". The user A returns the box lunch C to the shelf C in accordance with the announcement and takes out a correct box lunch A from the shelf A. FIG. 11C is a shelf image after the box lunch A has been taken out. The edge GW 101 can acquire the arrangement and the number of box lunches and determine that the box lunch A has been correctly received by the user A by comparing the shelf images of FIG. 11A and FIG. 11C.

Third Example Embodiment

Figure 12:
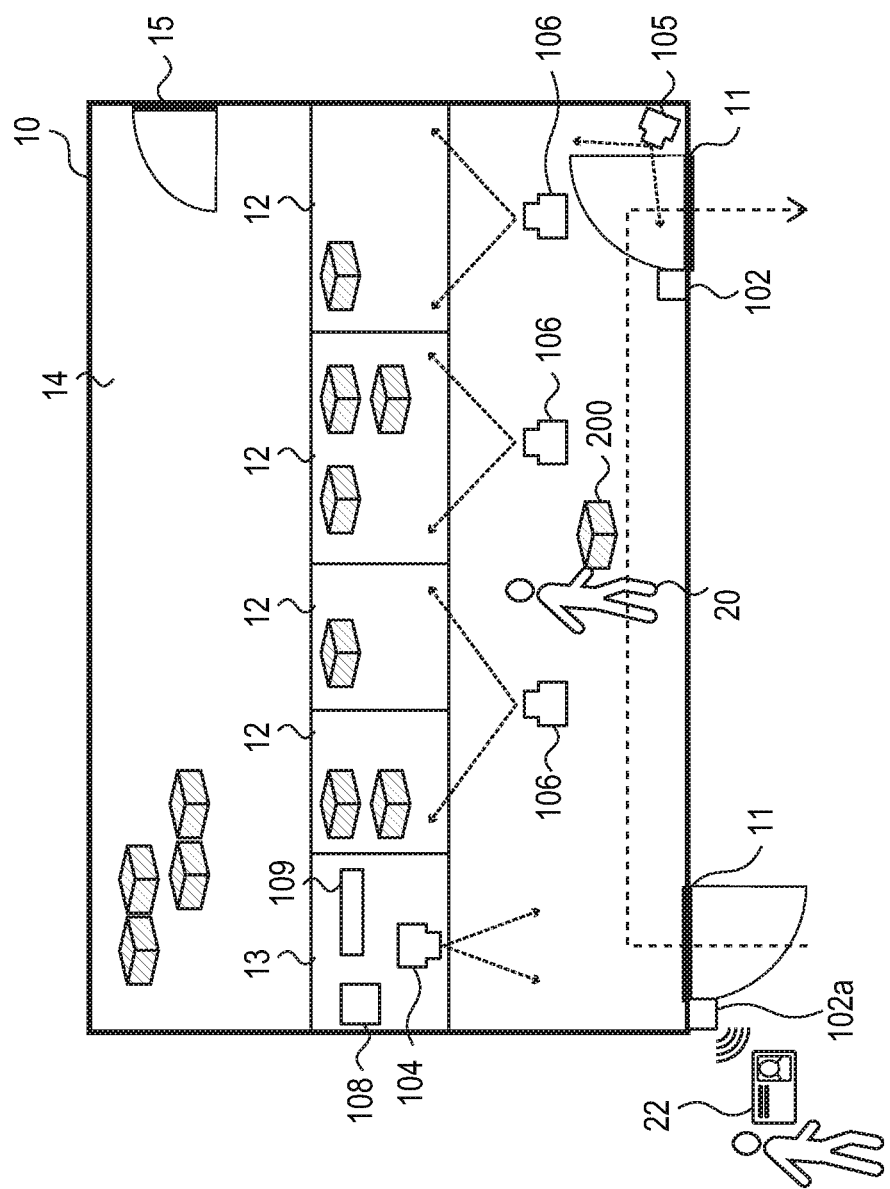
FIG. 12 is a plan view of a storeroom according to a third example embodiment.

FIG. 12 is a plan view of a storeroom according to the present example embodiment. The storeroom 10 is a walk-through type room and has two doors 11 for entry-only and exit-only. The card reader 102a is provided to the entry-only door 11, and the card reader 102 is provided to the exit-only door 11. Inside the storeroom 10, a plurality of shelves 12 are aligned, and a backyard 14 for storing articles not accommodated in the shelves 12 is provided behind the plurality of shelves 12. Only the salesclerk of the shop and delivery person of a logistics company can enter the backyard 14 via a management door 15. Inside the storeroom 10, while moving from the entrance door 11 to the exit door 11, the user 20 takes out his/her article 200 from the shelf 12 in accordance with guidance made by the display 109 and the audio terminal 108. Since the shelf cameras 106 are provided to every one or multiple shelves 12, this reduces the user 20 being included inside the angle of view of the shelf camera 106.

Fourth Example Embodiment

In the example embodiments described above, the article 200 is stored in the storeroom 10, and the user 20 is permitted to enter the storeroom 10 and exit the storeroom 10 by unlocking the door 11 of the storeroom 10. In the present example embodiment, as a place where the article 200 is stored, a storage area where entry is restricted is prepared instead of the storeroom 10. The storage area is not limited to a separate space surrounded by walls, a floor, and a ceiling, such as the storeroom 10, and may be a space in which a part of walls is opened. For example, as a storage area, a delivery space partitioned by partitions or the like is installed in a section inside a shop. Furthermore, gates used for restricting entry and exit of the user to and from the storage area are installed at the entrance of the storage area. For example, the gate is of a both-side open/close type, which is controlled by the edge GW 101 or the card reader unit 102 so as to be normally closed and then opened when the user is permitted to enter and exit the storage area. The gate may have the electric lock 103. Any configuration of gates may be employed, and the door 11 in the example embodiment described above is also included in the scope of the gate.

Fifth Example Embodiment

Figure 13:
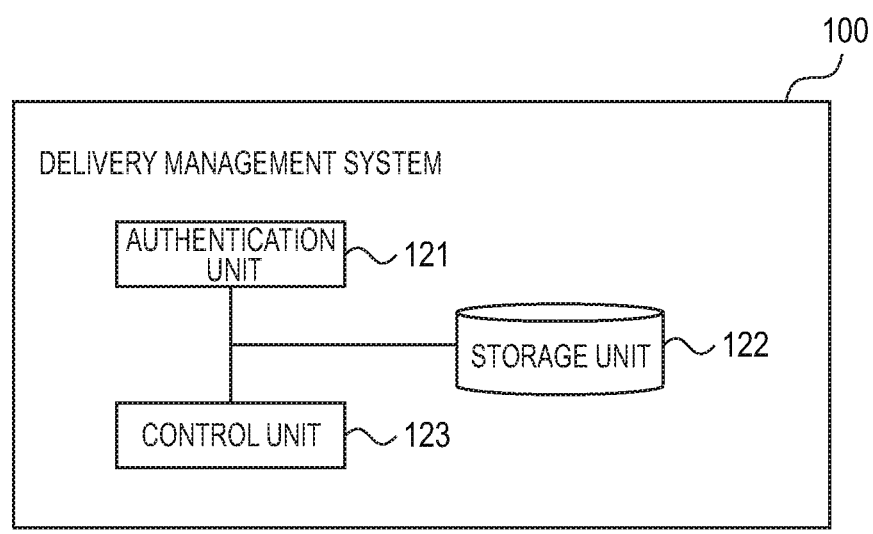
FIG. 13 is a general configuration diagram of a delivery management system according to a fifth example embodiment.

FIG. 13 is a schematic configuration diagram of a delivery management system according to the present example embodiment. The delivery management system 100 has the authentication unit 121 that authenticates the user 20, the storage unit 122 that stores information on an article stored in a storage area (the storeroom 10) that is a target article associated with the user 20, and the control unit 123 that permits the authenticated user 20 to enter the storage area and, when an article carried out by the user 20 from the storage area is the same as the target article, permits the user 20 to exit the storage area.

Modified Example Embodiments

The present invention is not limited to the example embodiments described above and can be appropriately changed within the scope not departing from the spirit of the present invention. For example, the edge GW 101 may recognize the position of the article 200 by using a radio frequency identification (RFID) technology instead of the OCR technology. It is possible to recognize that the article 200 is taken out from the shelf 12 by attaching an RF tag storing identification information to the article 200 and detecting a change in the signal from the attached RF tag.

Further, the shelf 12 may have a chilled case having a refrigerator or freezer function or the like suitable for storing box lunches or the like. An air curtain may be used on the front face of the chilled case. Furthermore, face matching of the user 20 using the authentication camera 104 is not limited for the subject user. For example, a face image of a person who may use the user card 22 may be registered in advance so that even a person other than the subject user, such as a family member, a roommate, or the like can use the user card 22.

Further, the scope of each of the example embodiments includes a processing method that stores, in a storage medium, a program that causes the configuration of each of the example embodiments to operate so as to implement the function of each of the example embodiments described above (more specifically, a program that causes a computer to perform the method illustrated in FIG. 6 to FIG. 9), reads the program stored in the storage medium as a code, and executes the program in a computer. That is, the scope of each of the example embodiments also includes a computer readable storage medium. Further, each of the example embodiments includes not only the storage medium in which the program described above is stored but also the program itself.

As the storage medium, for example, a floppy (registered trademark) disk, a hard disk, an optical disk, a magneto-optical disk, a CD-ROM, a magnetic tape, a nonvolatile memory card, or a ROM can be used. Further, the scope of each of the example embodiments includes an example that operates on OS to perform a process in cooperation with another software or a function of an add-in board without being limited to an example that performs a process by an individual program stored in the storage medium.

The whole or part of the example embodiments disclosed above can be described as, but not limited to, the following supplementary notes.

(Supplementary Note 1)

A delivery management system comprising:

an authentication unit that authenticates a user;

a storage unit that stores identification information on an article stored in a storage area that is a target article associated with the user; and a control unit that, when an article carried out by the authenticated user from the storage area is the same as the target article, permits the user to exit the storage area.

(Supplementary Note 2)

The delivery management system according to supplementary note 1, wherein the control unit determines whether or not the carried out article and the target article are the same by comparing identification information on the carried out article with identification information on the target article.

(Supplementary Note 3)

The delivery management system according to supplementary note 2, wherein the control unit acquires, from image data including a voucher attached to the article, the identification information by reading identification information written in the voucher.

(Supplementary Note 4)

The delivery management system according to supplementary note 3, wherein the control unit acquires the identification information by reading a character written in the voucher.

(Supplementary Note 5)

The delivery management system according to supplementary note 3 or 4, wherein the article is arranged in a shelf inside the storage area installed so that an image of the voucher is captured.

(Supplementary Note 6)

The delivery management system according to supplementary note 5, wherein the control unit identifies identification information of the article carried out by the user based on a difference between a plurality of image data obtained by capturing images of arrangement of the article inside the storage area.

(Supplementary Note 7)

The delivery management system according to supplementary note 5 or 6, wherein the control unit acquires a position of the article based on a shelf label attached to each section of the shelf.

(Supplementary Note 8)

The delivery management system according to supplementary note 6 or 7, wherein the control unit performs control to direct the user to a position of the target article in the shelf.

(Supplementary Note 9)

The delivery management system according to any one of supplementary notes 5 to 8 further comprising an image capture unit used for capturing the shelf.

(Supplementary Note 10)

The delivery management system according to any one of supplementary notes 1 to 9, wherein the control unit registers, in the authentication unit, permission information on the user for which entry or exit is permitted, and the authentication unit authenticates the user based on the registered permission information.

(Supplementary Note 11)

The delivery management system according to supplementary note 10, wherein the authentication unit authenticates the user by matching authentication information on the user with the permission information.

(Supplementary Note 12)

The delivery management system according to supplementary note 10 or 11, wherein the control unit deletes the permission information when the user enters the storage area and, when the carried out article and the target article are the same, re-registers the permission information.

(Supplementary Note 13)

The delivery management system according to any one of supplementary notes 1 to 12, wherein the control unit drives a gate that restricts entry and exit of the user.

(Supplementary Note 14)

The delivery management system according to supplementary note 13, wherein the gate comprises an electric lock, and the authentication unit unlocks the electric lock when authenticating the user for which entry or exit is permitted.

(Supplementary Note 15)

The delivery management system according to any one of supplementary notes 1 to 14, wherein the control unit stores image data acquired from an image capture unit provided inside the storage area in the storage unit in association with the user.

(Supplementary Note 16)

The delivery management system according to any one of supplementary notes 1 to 15 further comprising a storeroom as the storage area.

(Supplementary Note 17)

The delivery management system according to any one of supplementary notes 1 to 16, wherein permission information on the user for which entry is permitted and identification information on the target article are received from a management server.

(Supplementary Note 18)

A management server that transmits identification information on a target article to a delivery management system comprising an authentication unit that authenticates a user and a control unit that acquires identification information on an article stored in a storage area that is the target article associated with the user and, when the article carried out by the authenticated user from the storage area and the target article are the same, permits the user to exit the storage area.

(Supplementary Note 19)

The management server according to supplementary note 18, wherein information on the target article is acquired from a server of a company that distributes the target article to the storage area.

(Supplementary Note 20)

A delivery management method comprising steps of:
authenticating a user;
storing identification information on an article stored in a storage area that is a target article associated with the user; and
when an article carried out by the authenticated user from the storage area is the same as the target article, permitting the user to exit the storage area.

(Supplementary Note 21)

A storage medium storing a program that causes a computer to perform steps of:
authenticating a user;
storing identification information on an article stored in a storage area that is a target article associated with the user; and
when an article carried out by the authenticated user from the storage area is the same as the target article, permitting the user to exit the storage area.

This application is based upon and claims the benefit of priority from Japanese Patent Application No. 2017-174510, filed on Sep. 12, 2017, the disclosure of which is incorporated herein in its entirety by reference.

The invention claimed is:

1. A delivery management system comprising:
an authentication unit that authenticates a user;
a storage unit that stores identification information on an article stored in a storage area that is a target article associated with the user; and
a control unit that, when identification information of an article carried out by the authenticated user from the storage area is the same as the identification information of the target article, permits the user to exit the storage area,
wherein the control unit acquires, from image data including a voucher attached to the article, the identification information by reading identification information written in the voucher and
wherein the control unit identifies identification information of the article carried out by the user based on a difference between a plurality of image data obtained by capturing images of arrangement of the article inside the storage area.

2. The delivery management system according to claim 1, wherein the control unit acquires the identification information by reading a character written in the voucher.

3. The delivery management system according to claim 1, wherein the article is arranged in a shelf inside the storage area installed so that an image of the voucher is captured.

4. The delivery management system according to claim 3, wherein the control unit acquires a position of the article based on a shelf label attached to each section of the shelf.

5. The delivery management system according to claim 1, wherein the control unit performs control to direct the user to a position of the target article in the shelf.

6. The delivery management system according to claim 3 further comprising an image capture unit used for capturing the shelf.

7. The delivery management system according to claim 1, wherein the control unit registers, in the authentication unit, permission information on the user for which entry or exit is permitted, and the authentication unit authenticates the user based on the registered permission information.

8. The delivery management system according to claim 7, wherein the authentication unit authenticates the user by matching authentication information on the user with the permission information.

9. The delivery management system according to claim 7, wherein the control unit deletes the permission information when the user enters the storage area and, when the carried out article and the target article are the same, re-registers the permission information.

10. The delivery management system according to claim 1, wherein the control unit drives a gate that restricts entry and exit of the user.

11. The delivery management system according to claim 10, wherein the gate comprises an electric lock, and the authentication unit unlocks the electric lock when authenticating the user for which entry or exit is permitted.

12. The delivery management system according to claim 1, wherein the control unit stores image data acquired from an image capture unit provided inside the storage area in the storage unit in association with the user.

13. The delivery management system according to claim 1 further comprising a storeroom as the storage area.

14. The delivery management system according to claim 1, wherein permission information on the user for which entry is permitted and identification information on the target article are received from a management server.

15. A management server that transmits identification information on a target article to a delivery management system comprising:
an authentication unit that authenticates a user and
a control unit that acquires identification information on an article stored in a storage area that is the target article associated with the user and, when identification information of the article carried out by the authenticated user from the storage area is the same as the identification information of the target article, permits the user to exit the storage area,
wherein the control unit acquires, from image data including a voucher attached to the article, the identification information by reading identification information written in the voucher and
wherein the control unit identifies identification information of the article carried out by the user based on a difference between a plurality of image data obtained by capturing images of arrangement of the article inside the storage area.

16. The management server according to claim 15, wherein information on the target article is acquired from a server of a company that distributes the target article to the storage area.

17. A delivery management method comprising:
authenticating a user;
storing identification information on an article stored in a storage area that is a target article associated with the user;
when identification information of an article carried out by the authenticated user from the storage area is the same as the identification information of the target article, permitting the user to exit the storage area,
acquiring, from image data including a voucher attached to the article, the identification information by reading identification information written in the voucher; and
identifying identification information of the article carried out by the user based on a difference between a plurality of image data obtained by capturing images of arrangement of the article inside the storage area.

18. A non-transitory storage medium storing a program that causes a computer to perform:
authenticating a user;
storing identification information on an article stored in a storage area that is a target article associated with the user;
when identification information of an article carried out by the authenticated user from the storage area is the same as the identification information of the target article, permitting the user to exit the storage area;
acquiring, from image data including a voucher attached to the article, the identification information by reading identification information written in the voucher; and
identifying identification information of the article carried out by the user based on a difference between a plurality of image data obtained by capturing images of arrangement of the article inside the storage area.

* * * * *